US011335128B2

United States Patent
Arora et al.

(10) Patent No.: US 11,335,128 B2
(45) Date of Patent: May 17, 2022

(54) METHODS AND SYSTEMS FOR EVALUATING A FACE RECOGNITION SYSTEM USING A FACE MOUNTABLE DEVICE

(71) Applicant: Visa International Service Association, San Francisco, CA (US)

(72) Inventors: Sunpreet Singh Arora, San Mateo, CA (US); Cori Christine Tymoszek, Okemos, MI (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 294 days.

(21) Appl. No.: 16/688,871

(22) Filed: Nov. 19, 2019

(65) Prior Publication Data

US 2021/0150238 A1    May 20, 2021

(51) Int. Cl.
*G06V 40/40* (2022.01)
*G06F 21/32* (2013.01)
*G06F 21/57* (2013.01)
*G06V 40/16* (2022.01)

(52) U.S. Cl.
CPC .............. *G06V 40/40* (2022.01); *G06F 21/32* (2013.01); *G06F 21/577* (2013.01); *G06V 40/161* (2022.01); *G06V 40/172* (2022.01); *G06F 2221/034* (2013.01)

(58) Field of Classification Search
CPC .......... G06K 9/00899; G06K 9/00228; G06K 9/00288; G06F 21/32; G06F 21/577; G06F 2221/034
See application file for complete search history.

(56) References Cited

U.S. PATENT DOCUMENTS

| 2019/0050632 | A1* | 2/2019 | Weng | G06F 17/15 |
| 2019/0238568 | A1* | 8/2019 | Goswami | G06F 21/566 |
| 2019/0332850 | A1* | 10/2019 | Sharma | G06K 9/00308 |
| 2020/0082097 | A1* | 3/2020 | Poliakov | G06F 21/577 |

OTHER PUBLICATIONS

Sharif et al: "Accessorize to a Crime: Real and Stealthy Attacks on State-of-the-Art Face Recognition", 2016 (Year: 2016).*

(Continued)

*Primary Examiner* — Ruiping Li
(74) *Attorney, Agent, or Firm* — Schwabe, Williamson & Wyatt PC

(57) ABSTRACT

A computer-implemented method is disclosed. The method includes a) accessing a first image, b) accessing a second image, c) from an adversarial pattern generating system, generating a face recognition adversarial pattern for display from a specified region of a face corresponding to the second image, the face recognition adversarial pattern operable to minimize a measure of distance as determined by a face recognition system, between the face and a class of the first image, or to maximize a probability of the misclassification of the second image by the face recognition system, d) providing a face mountable device, that is mounted on the face, access to the face recognition adversarial pattern in real time via a communications component, and e) controlling light patterns on the face mountable device according to the face recognition adversarial pattern.

20 Claims, 5 Drawing Sheets

(56) References Cited

OTHER PUBLICATIONS

Athalye et al., "Synthesizing Robust Adversarial Examples." Proceedings of the 35th International Conference on Machine Learning, Stockholm, Sweden, PMLR 80, 2018. Accessed from the Internet at https://arxiv.org/pdf/1707.07397.pdf.

Sharif et al., Oct. 2016, "Accessorize to a crime: Real and stealthy attacks on state-of-the-art face recognition" In Proceedings of the 2016 ACM SIGSAC Conference on Computer and Communications Security (pp. 1528-1540). ACM.

\* cited by examiner

METHODS AND SYSTEMS FOR EVALUATING A FACE RECOGNITION SYSTEM USING A FACE MOUNTABLE DEVICE

TECHNICAL FIELD

Embodiments of the disclosure relate to methods and systems for evaluating face recognition systems and, in particular, to methods and systems that use face mountable devices to evaluate face recognition systems.

TECHNOLOGY BACKGROUND

Machine learning (ML) is the scientific study of algorithms and statistical models that computer systems use to perform a specific task without using explicit instructions, relying on patterns and inference instead. It is seen as a subset of artificial intelligence. Machine learning algorithms build a mathematical model based on sample data, known as "training data", in order to make predictions or decisions without being explicitly programmed to perform such.

Deep learning is a sub-branch of machine learning that is used in state of the art face recognition systems. Deep learning has its roots in human neural system modeling. It uses deep neural networks that include several interconnected layers of neurons. The neural networks are trained on a particular task, such as face recognition, using specially designed optimization techniques. State of the art neural networks use a few hundred neural layers and large amounts of training data for supervised learning (e.g., thousands or even millions of face images and corresponding subject identifications).

Face recognition systems are used to identify or verify a person from a digital image or a video frame from a video source. Components of face recognition systems can include but are not limited to sensor/camera modules, pre-processing modules for face detection and normalization (e.g., face alignment) and feature embedding and classification/decision modules. Pre-processing, feature embedding and classification/decision modules are typically designed using neural networks. There are multiple face recognition operating methodologies, but in general, such methodologies involve: (i) subject image storage where representative facial images of subjects are stored in a gallery/database, and (ii) subject recognition where a query face image is compared to the gallery/database for recognizing the subject. Neural networks that are trained for face recognition can be used to recognize faces from still images or video images. These networks automatically learn feature embeddings that can characterize different faces and how to distinguish between the different faces for recognition tasks. More generally, face recognition systems are a category of biometric recognition systems that can uniquely recognize a person by analyzing biometric traits of the person. In the specific case of face recognition, such facial features can be, for example, the shape, size and texture of the face.

Face recognition systems can be vulnerable to attacks by sophisticated attackers who design attacks that are effective at evading machine learning classifiers designed to detect them. Common types of attacks include but are not limited to impersonation and evasion attacks. Typical ways of executing such attacks involve the use of printed photos or replay videos. More advanced adversarial attacks manipulate the input to neural networks directly in order to fool them. Such attacks can be digital wherein the digital image that is captured by a camera is modified digitally or physical wherein the sensory input to a camera is modified in the physical world. In the latter case, the modification of the sensory input in the physical world results in a manipulated digital image.

A particularly concerning mode of attack are attacks that are physically realizable and at the same time inconspicuous. In such attacks, the attacker manipulates the physical state of the subject that a machine learning algorithm is analyzing rather than the digitized representation of this physical state. A characteristic of such attacks is that the manipulations of the physical state of the subject that are used in the attacks are sufficiently subtle such that they are either imperceptible to humans or, if perceptible, seem natural and not representative of an attack.

DESCRIPTION OF THE EMBODIMENTS

The embodiments described herein are not intended to be limited to the specific forms set forth herein. The embodiments are intended to cover such alternatives, modifications, and equivalents that are within the scope of the appended claims.

The detailed description that follows includes numerous specific details such as specific method orders, configurations, structures, elements, and connections have been set forth. It is to be understood however that these and other specific details need not be utilized to practice embodiments. In other embodiments, well-known structures, elements, or connections have been omitted, or have not been described in a manner so as not to obscure this description.

Any reference within the specification to "one embodiment" or "an embodiment" is intended to indicate that a particular feature, configuration, structure, or characteristic described in connection with the embodiment is included in at least one embodiment of the present invention. The appearance of the phrase "in one embodiment" in different parts of the specification can refer to different embodiments. Embodiments described as separate or alternative embodiments are not mutually exclusive of other embodiments. Moreover, various features are described which may be included in some embodiments and not by others. In additions, some requirements for some embodiments may not be required for other embodiments.

In the following description, unless indicated otherwise terms such as "accessing" or "controlling" or "providing" or "generating" or the like, refer to the operations and processes of a computer system, or similar electronic computing device that manipulates and transforms data represented as physical (electronic) quantities within the computer system's registers and memories and other computer readable media into other data similarly represented as physical quantities within the computer system memories or registers or other such information storage, transmission or display devices.

Figure 1A:
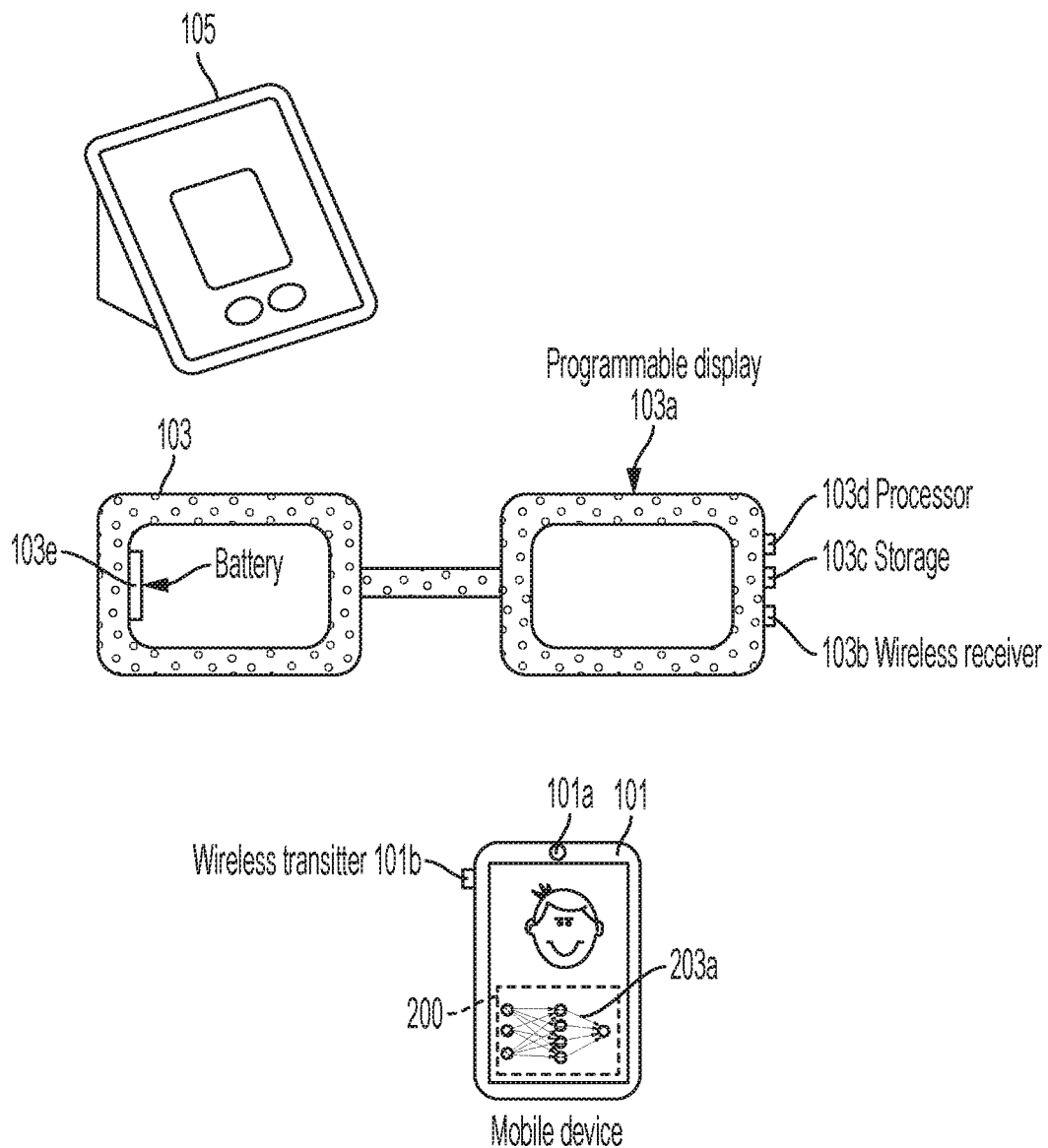
FIG. 1A illustrates an operating environment of a system for evaluating face recognition systems using a face mountable device according to an embodiment.

FIG. 1A illustrates an operating environment of a system 200 for evaluating face recognition systems using a face mountable device according to an embodiment. FIG. 1A shows host computer system 101, face mountable device 103, face recognition system 105 and system 200.

Referring to FIG. 1A, in an embodiment, the host computer system 101 can include but is not limited to a desktop, a laptop, tablet or smartphone. In an embodiment, the host computer system 101 can include camera 101a and communication component 101b. In an embodiment, the system 200 can reside on the host computer system 101. In an embodiment, the system 200 can include a neural network 203a that can be used to test adversarial patterns that can be used to enable the impersonation of a targeted individual or the evasion of recognition by a random individual. In particular, as regards impersonation, the neural network 203a can be caused to classify a source image of an adversary, as modified by the adversarial pattern, as a target image belonging to an individual of whom impersonation is desired. Moreover, as regards recognition evasion, the neural network 203a can be caused to classify a source image of an adversary, as modified by the adversarial pattern, as not belonging to the class of the source image. The foregoing can be done in order to evaluate the susceptibility of the face recognition system 105 to impersonation attacks and evasion attacks. In an embodiment, the neural network 203a can include functions that map images (source or target images) to probability distributions over classes. In an embodiment, by modifying the source image with the adversarial pattern the source image can be intentionally caused to be mapped to the class of the target image (for impersonation) or not to be mapped to the class of the source image (for evasion).

In an embodiment, as part of causing the mapping of the source image to the class of the target image, the adversarial pattern can be used to perturb the source image in a manner that maximizes the probability of classification in the class of the target image. In an embodiment, as part of causing the mapping of the source image to a class other than the class of the source image, the adversarial pattern can be used to perturb the source image in a manner that minimizes the probability of classification in the class of the source image. More specifically, a modification of the source image is found and caused to be embodied in the adversarial pattern in order to effect a desired classification result. For example, the adversarial pattern can be superimposed on the source image and the resulting image tested to determine if it mapped to the target class (for impersonation attacks) or if it did not map to the source class (for evasion attacks). In an embodiment, thereafter, an adversarial pattern that is determined to effect the desired classification result can be transmitted to a face-mountable device that is mounted on the face of an adversary.

In an embodiment, the face mountable device 103 can include programmable display 103a, receiver 103b, data storage component 103c, processing component 103d, and power supply 103e. In an embodiment, the programmable display 103a can include a plurality of pixels.

In an embodiment, the setup shown in FIG. 1A can be used for repeatable security evaluation of deep learning based face recognition systems for susceptibility to physical adversarial attacks. In an embodiment, the face mountable device 103 can include a wearable eyeglass frame that includes a programmable semi-continuous display (e.g. micro LED array or LCD/LED/OLED display). In other embodiments, the face mountable device 103 can be implemented in other manners (e.g., a headband, a cheek patch, etc.). The power supply 103e can include a battery module that supplies power to the programmable display 103a. The programmable display 103a can include an LED array. In an embodiment, the communication component 101b can include a wireless communication (e.g., Bluetooth/Wi-Fi) module to transmit data from the adversarial pattern generating device (e.g., host computer system 101). In an embodiment, the adversarial pattern generating device (e.g., host computer system 101) can include but is not limited to a smartphone or a laptop.

In an embodiment, the data storage component 103c can include a temporary storage module to cache the adversarial pattern. In an embodiment, the processing component 103d can include a processing module to execute instructions corresponding to the adversarial pattern that cause the display of the adversarial pattern on the face mountable device 103. In an embodiment, given facial image(s) of the target and the adversary, adversarial patterns designed for display around the eye region can be first computed on the adversarial pattern generating device 101. The adversarial pattern can then be post-processed to make it displayable on the face mountable device 103, and then transmitted to the face mountable device 103 via the communication component 101b. The face mountable device 103 with the lighted display can be worn by the adversary in front of the face recognition system 105 to impersonate a target or to evade recognition. This process can be repeated for different face image pairs to estimate the susceptibility of the face recognition system 105 to adversarial attacks.

Operation

Figure 1B:
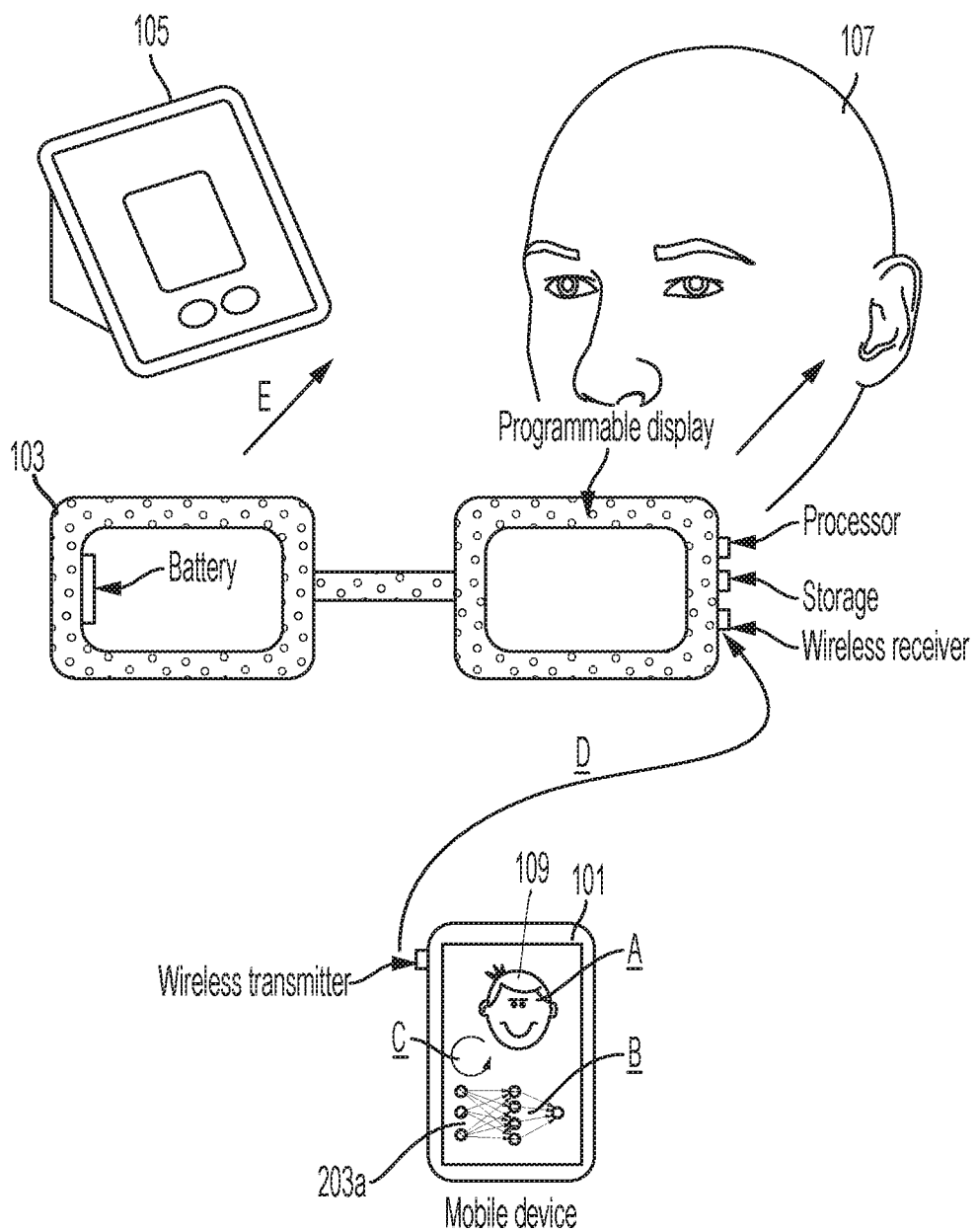
FIG. 1B illustrates operations performed by a system for evaluating face recognition systems using a face mountable device according to an embodiment.

FIG. 1B illustrates example operations of a process for evaluating face recognition systems using a face mountable device. FIG. 1B is described in the context of an evaluation of an impersonation attack on a face recognition system. Referring to FIG. 1B, at operation A, facial images of an adversary and a target are acquired and stored on the host computer system 101, e.g., mobile device, smartphone, laptop, etc. In an embodiment, the facial image of the adversary 107 is the source image and the facial image of the target is the target image 109. In an embodiment, images can be acquired and stored directly on the host computer system 101 by using a device such as a camera module of the host computer system 101 to capture facial images of the adversary 107 and target. Alternatively, images can be acquired and stored by uploading them through another interface (e.g., web, storage file/folder).

At operation B, given facial images of the adversary 107 and the target, and a neural network, e.g., of system 200 shown in FIG. 1A, that is trained to recognize faces, adversarial pattern generation methods are used to digitally generate an adversarial pattern corresponding to a particular region of the face of the adversary 107. In an embodiment, the adversarial pattern generation methods can include but are not limited to fast gradient step method (FGSM) or projected gradient descent (PGD). In an embodiment, the adversarial pattern generation methods are used to digitally generate an adversarial pattern corresponding to the region of the face where the device will be mounted. In an embodiment, the region of the face where the device will be mounted can include but is not limited to the region of the face surrounding the eyes of the adversary. In other embodiments, the adversarial pattern generation methods can be used to digitally generate an adversarial pattern corresponding to other facial regions. In an embodiment, the adversarial pattern is created such that when it is applied to the adversary's face image, the neural network 203a misclassifies the adversary's face image as being that of the target's.

At operation C, depending on the characteristics of the display of the face mountable device 103 and the ambient light sensed by the host computer system 101, the adversarial pattern generated at operation B is post-processed to make it appropriately displayable on the face mountable device's display. For example, if the display fidelity is low (e.g., a basic micro-LED array display) the adversarial pattern can be post-processed to address this constraint. In other embodiments, such constraints can be addressed by integrating operations that address such constraints into optimizations that are a part of B (instead of providing standalone post-processing).

In addition, the pattern can be also post-processed to make it invariant to translation, rotation, scaling and photometric variations. In an embodiment, the post-processing can be implemented as described in Athalye, Engstrom, Ilyas, and Kwok, "Synthesizing Robust Adversarial Examples." Proceedings of the $35^{th}$ International Conference on Machine Learning, Stockholm, Sweden, PMLR 80, 2018. Accessed at https://arxiv.org/pdf/1707.07397.pdf. In other embodiments, the post-processing can be implemented in other manners. The post processing can assist in reducing sensitivity to physical factors for an increased likelihood of success.

At operation D, the adversarial pattern is transmitted wirelessly to the face mountable device 103, where it is stored temporarily, and prepared for display.

At operation E, the face mountable device 103 is mounted on the face of the adversary 107 to impersonate the target in order to test the face recognition system 105. In an embodiment, the underlying neural network architecture of the face recognition system that is to be tested can be different from the neural network 203a used to generate the adversarial pattern. However, it should be appreciated that adversarial patterns can be highly transferable (e.g., effective) across different neural network architectures. In an embodiment, operations A-E are repeated for different adversary-target face pairs to determine the susceptibility of the face recognition system to impersonation attacks. In an embodiment, operations similar to those illustrated by operations A-E can be used to evaluate the face recognition system 105 for evasion attacks. In an embodiment, unlike existing approaches that require fabrication of physical artefacts such as printed photos and masks (and hence are only useful for a limited range of security evaluations), exemplary methods can be used for repeatable operational security evaluation of face recognition systems at scale.

Figure 2:
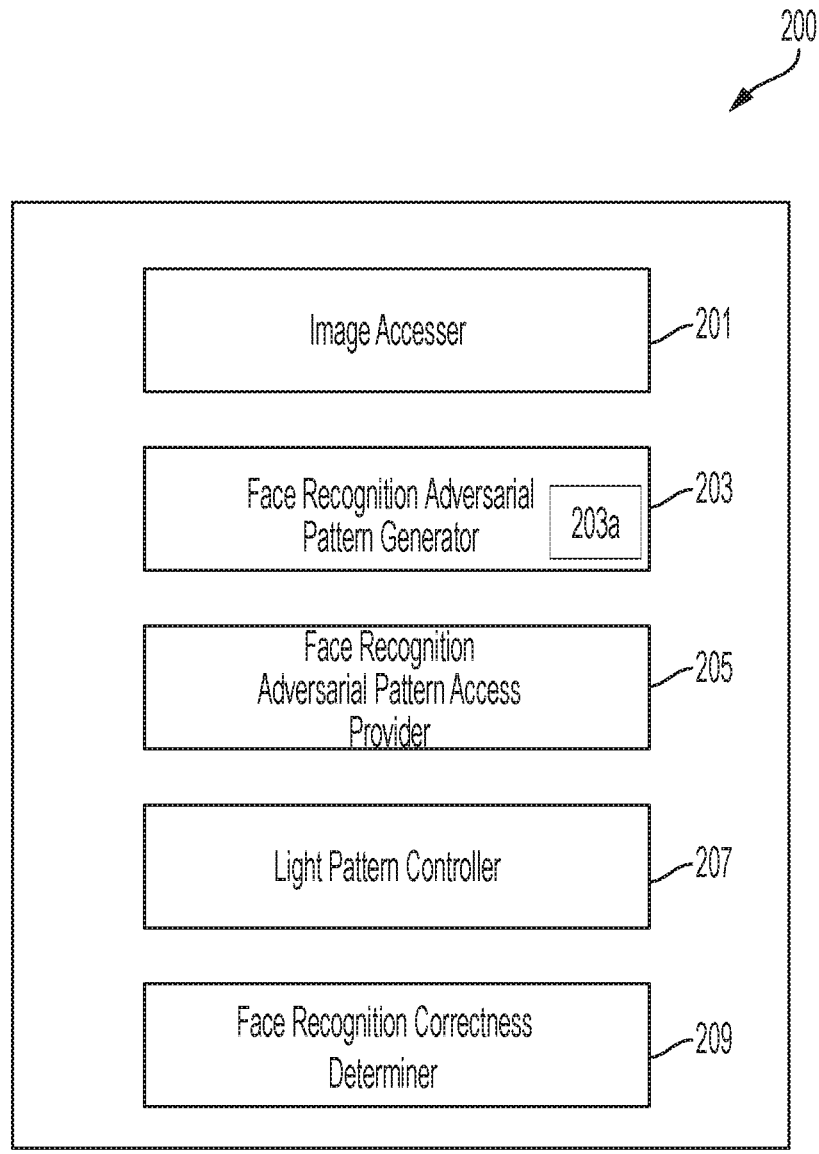
FIG. 2 shows components of the system for evaluating face recognition systems using a face mountable device according to an embodiment.

FIG. 2 shows components of the system 200 for evaluating face recognition systems with wearable adversarial glasses. In an embodiment, the system 200 can evaluate face recognition systems for impersonation attacks and for evasion attacks. In an embodiment, system 200 includes image accessor 201, face recognition adversarial pattern generator 203, face recognition adversarial pattern access provider 205, light pattern controller 207, and face recognition correctness determiner 209.

Referring to FIG. 2, image accessor 201 accesses first and second images that are used to generate an adversarial pattern. In an embodiment, as regards impersonation attacks, the first and second images can respectively include a target image and a source image. In an embodiment, the source image can be an image of the face of an adversary that can have a pattern projected therefrom to cause a face recognition system to misinterpret as a face associated with the target image. More specifically, the pattern can enable the face of an adversary to have the pattern projected therefrom to enable the impersonation of the face associated with the target image. As regards evasion attacks, the second image can include a query version of the adversary's image (e.g., acquired version used to test the face recognition system). In an embodiment, the query version of the adversary's image can be used to generate an adversarial pattern that can be projected from the adversary's face to cause a face recognition system to incorrectly classify the adversary's face as not being the face of the adversary. In an embodiment, the adversarial pattern can be generated based on adversarial pattern generation methods described herein.

Face recognition adversarial pattern generator 203 generates a face recognition adversarial pattern for display from a specified region of a face corresponding to the adversary. In an embodiment, as regards impersonation attacks, the face recognition adversarial pattern is configured to minimize a measure of distance, as determined by a face recognition system, between the face corresponding to the source image (the adversary's) and a class of the face corresponding to the target image. In an embodiment, this distance can be a vector distance between feature embeddings corresponding to the two faces pertaining to one or more layers of an underlying neural network used by the face recognition system. In an embodiment, as regards evasion attacks, the face recognition adversarial pattern is configured to maximize the probability of misclassification of the face corresponding to the source image (e.g., minimize the probability that that the face corresponding to the source image is classified in the source class). In an embodiment, the face recognition adversarial pattern generator 203 can include neural network 203a (described previously with reference to FIG. 1A). In an embodiment, the neural network 203a can be used to test adversarial patterns that can be used to impersonate or evade. In particular, as regards impersonation attacks, the neural network 203a can be caused to classify a source image modified by a determined adversarial pattern as a target image. Alternately, as regards evasion attacks, the neural network 203a can be caused to misclassify the adversary's face image as modified by a determined adversarial pattern as not belonging to the class of the face image of the adversary. In an embodiment, the neural network 203a can be a face recognition type of neural network. Moreover, the neural network can be separate from the system that is to be tested.

In an embodiment, an attack can involve one or more images of an adversary, and one or more images of the target. It should be appreciated that, using more than one image for adversarial pattern generation, can increase the likelihood of causing a successful misclassification.

In other embodiments, face recognition adversarial pattern generator 203 can generate adversarial patterns using means other than neural networks that can include but are not limited to optimization methods such as fast gradient step method (FGSM) or projected gradient descent (PGD). In an embodiment, these methods involve the performance of iterative optimizations to find pixel perturbations that can minimize the distance between the source and target image for impersonation attacks or minimize the probability that the source image is classified in the source image class for evasion attacks (e.g., maximize the probability that the source image is not classified in the source image class). either in the neural network embedding or decision space.

Face recognition adversarial pattern access provider 205 provides a face mountable device that is mounted on the face of an adversary, access to the face recognition adversarial pattern in real time via a communications component. In an embodiment, the face recognition adversarial pattern access provider 205 provides a face mountable device, that is mounted on the face of the adversary, access to the face recognition adversarial pattern in real time by transmitting the face recognition adversarial pattern to the face mountable device.

Light pattern controller 207 controls light patterns on the face mountable device according to the face recognition adversarial pattern.

Face recognition correctness determiner 209 determines if the face recognition system has been successfully attacked. In an embodiment, the face recognition system can provide an indication of the result of a face recognition determination that can be accessed by the face recognition determiner 209 to determine if an attack is successful. For example, if an attack is an impersonation attack and the face recognition system indicates that the adversary's face image is the same as the target's face image, then the face recognition determiner 209 can determine that the attack was successful. Likewise, if an attack is an evasion attack and the face recognition system indicates that the adversary's face image is not a face image of the class of the adversary's face image, then face recognition determiner 209 can determine that the attack was successful. In an embodiment, this process can be repeated for different first image and second image pairs to determine the susceptibility of the face recognition system to an adversarial attack.

FIG. 2 illustrates an example manner of implementing the system 200 of FIG. 1. In an embodiment, one or more of the elements, processes, components and/or devices of the system 200 may be integrated, separated, re-arranged, omitted, eliminated and/or implemented in other manners. In an embodiment, the components of system 200 can be implemented using hardware, software, firmware and/or any combination thereof. In particular, components of system 200 can be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). In an embodiment, as regards software and/or firmware implementation of the system 200, at least one of the components of such is/are hereby expressly defined to include a non-transitory computer readable storage device or storage disk such as a memory, a digital versatile disk (DVD), a compact disk (CD), a Blu-ray disk, etc. including the software and/or firmware. It should be appreciated that, the example system 200 can include one or more elements, processes and/or devices in addition to, or instead of, those illustrated in FIG. 2, and/or may include more than one of any or all of the illustrated elements, processes and devices.

Figure 3:
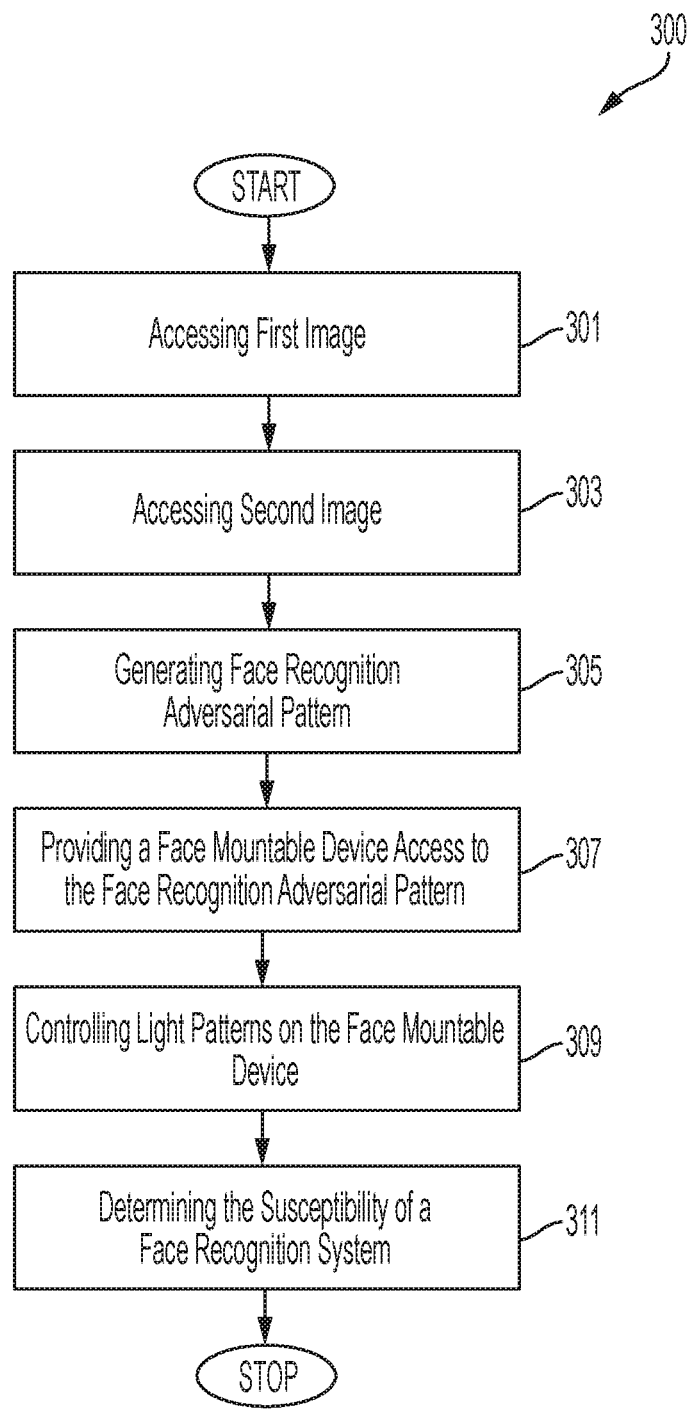
FIG. 3 is a flowchart of a method for evaluating face recognition systems using a face mountable device according to an embodiment.

FIG. 3 shows a flowchart 300 of a method for evaluating face recognition systems with wearable adversarial glasses according to an embodiment. Referring to FIG. 3, the method includes at, 301, a) accessing a first image. At 303, b) accessing a second image. At 305, c) from an adversarial pattern generating system, generating a face recognition adversarial pattern for display from a specified region of a face corresponding to the second image, the face recognition adversarial pattern operable to minimize a measure of distance, as determined by a face recognition system, between the face and a class of the first image or to maximize a probability of the misclassification of the second image by the face recognition system. At 307, d) providing a face mountable device, that is mounted on the face, access to the face recognition adversarial pattern in real time via a communications component. At 309, e) controlling light patterns on the face mountable device according to the face recognition adversarial pattern. At 311, f) determining if the face recognition system identifies the face as corresponding to the first image or the second image and repeating a) through e) for different first image and second image pairs to determine the susceptibility of the face recognition system to an adversarial attack.

In an embodiment, the method further includes post processing the face recognition adversarial pattern for viewing from the face mountable device before providing access to the face recognition adversarial pattern. In an embodiment, the adversarial pattern generating system uses an iterative optimization method for adversarial pattern generation and the face recognition system uses a neural network for face recognition. In an embodiment, the first image is a face image of a target and the second image is a face image of an adversary. In an embodiment, the adversarial pattern is configured to enable an impersonation of the first image. In an embodiment, the adversarial pattern is configured to enable an evasion of recognition related to the second image. In an embodiment, the face mountable device is configured to have the form of eyeglass frames. In an embodiment, the face mountable device includes one of a programmable LED array, a liquid crystal display (LCD) array and an organic light emitting diode (OLED) array.

In an embodiment, the operations of flowchart 300 can correspond to machine readable instructions of a program that can be executed by a processor of a computer system 400 such as is discussed with regard to FIG. 4 below. In some embodiments, the program and/or portions or parts thereof can be executed by a device other than a processor. The program can be stored on a non-transitory machine or computer readable storage medium such as a hard drive, a digital versatile disk (DVD), a read-only memory, a compact disk, a floppy disk, a Blu-ray disk, a cache, a random-access memory or other storage device. As used herein, the term non-transitory computer readable medium is intended to refer to computer readable storage devices and/or storage disks and to exclude propagating signals and to exclude transmission media. In some embodiments, the program can be embodied in firmware or dedicated hardware. In an embodiment, one or more of the operations of the flowchart can be performed without executing software or firmware. For example, one or more of the blocks may be implemented by one or more hardware circuits such as a Field Programmable Gate Array (FPGA), an Application Specific Integrated circuit (ASIC), a discrete and/or integrated analog and/or digital circuit, a comparator, an operational-amplifier (op-amp), a logic circuit, etc. It should be noted that the order of execution of the blocks of the flowchart of FIG. 3 may be changed. In addition, one or more of the blocks of the flowchart can be eliminated or other blocks added.

Figure 4:
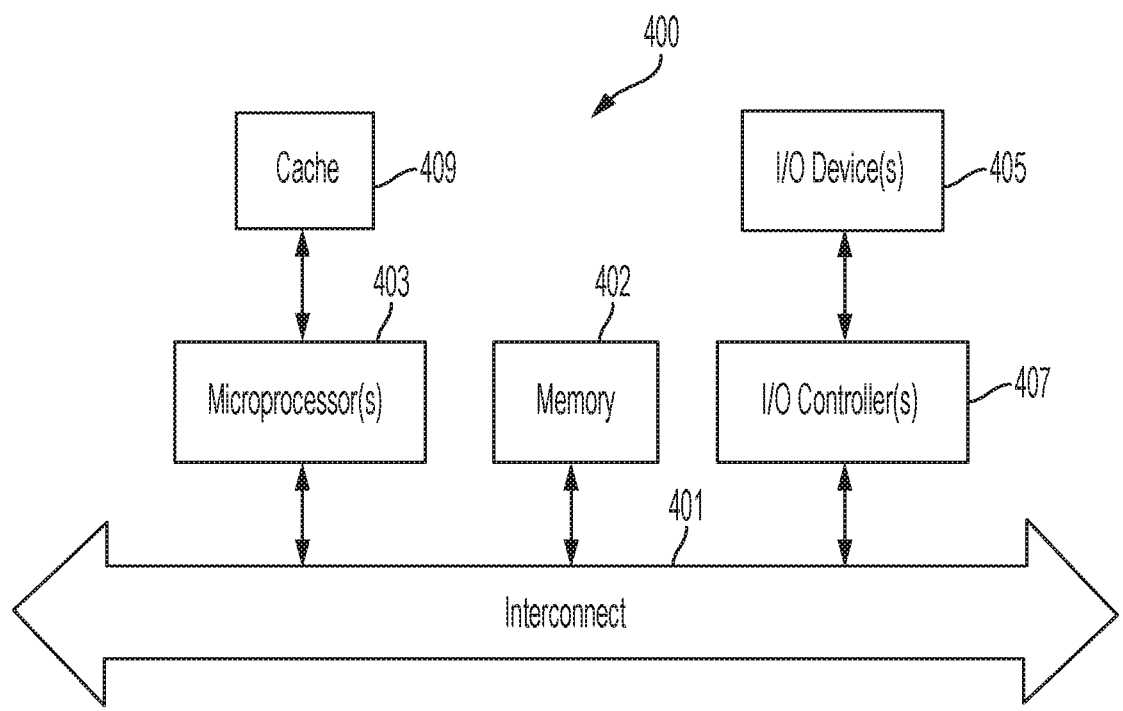
FIG. 4 illustrates a computing device in accordance with an embodiment.

FIG. 4 shows a computer system 400 according to an embodiment. The computer system 400 can include a microprocessor(s) 403 and memory 402. In an embodiment, the microprocessor(s) 403 and memory 402 can be connected by an interconnect 401 (e.g., bus and system core logic). In addition, the microprocessor 403 can be coupled to cache memory 409. In an embodiment, the interconnect 401 can connect the microprocessor(s) 403 and the memory 402 to input/output (I/O) device(s) 405 via I/O controller(s) 407. I/O devices 405 can include a display device and/or peripheral devices, such as mice, keyboards, modems, network interfaces, printers, scanners, video cameras and other devices known in the art. In an embodiment, (e.g., when the data processing system is a server system) some of the I/O devices (405), such as printers, scanners, mice, and/or keyboards, can be optional.

In an embodiment, the interconnect 401 can include one or more buses connected to one another through various bridges, controllers and/or adapters. In one embodiment, the I/O controllers 407 can include a USB (Universal Serial Bus) adapter for controlling USB peripherals, and/or an IEEE-1394 bus adapter for controlling IEEE-1394 peripherals.

In an embodiment, the memory 402 can include one or more of: ROM (Read Only Memory), volatile RAM (Random Access Memory), and non-volatile memory, such as hard drive, flash memory, etc. Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In this description, some functions and operations are described as being performed by or caused by software code to simplify description. However, such expressions are also used to specify that the functions result from execution of the code/instructions by a processor, such as a microprocessor.

Alternatively, or in combination, the functions and operations as described here can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While one embodiment can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of the present disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of an application claiming priority to this provisional application to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A computer-implemented method, comprising:
   a) accessing a first image;
   b) accessing a second image;
   c) from an adversarial pattern generating system, generating a face recognition adversarial pattern for display from a specified region of a face corresponding to the second image, the face recognition adversarial pattern operable to minimize a measure of distance, as determined by a face recognition system, between the face and a class of the first image or to maximize a probability of the misclassification of the second image by the face recognition system;
   d) providing a face mountable device having a programmable display access to the face recognition adversarial pattern in real time via a communications component;
   e) controlling light patterns on the face mountable device according to the face recognition adversarial pattern; and
   f) determining if the face recognition system identifies the face as corresponding to the first image or the second image and repeating a) through e) for different first image and second image pairs to determine a susceptibility of the face recognition system to an adversarial attack.

2. The method of claim 1, further comprising:
   post processing the face recognition adversarial pattern for viewing from the face mountable device before providing access to the face recognition adversarial pattern.

3. The method of claim 1, wherein the adversarial pattern generating system uses an iterative optimization method for adversarial pattern generation and the face recognition system uses a neural network for face recognition.

4. The method of claim 1, wherein the first image is a face image of a target and the second image is a face image of an adversary.

5. The method of claim 1, wherein the second image is a face image of a random adversary.

6. The method of claim 1, wherein the adversarial pattern is configured to enable an impersonation of an individual corresponding to the first image.

7. The method of claim 1, wherein the adversarial pattern is configured to enable evasion of recognition as an individual corresponding to the second image.

8. The method of claim 1, wherein the face mountable device is configured as an eyeglass frame.

9. The method of claim 1, wherein the face mountable device includes one of a programmable light emitting diode (LED) array, a liquid crystal display (LCD) array and an organic light emitting diode (OLED) array.

10. A face mountable device, comprising:
a power supply;
a communication component to receive a face recognition adversarial pattern in real-time from an adversarial pattern generating system;
a data storage component to store the face recognition adversarial pattern;
an electronic visual display to display light patterns from a specified region of a face; and
a processing component to control the light patterns displayed by the electronic visual display according to the face recognition adversarial pattern, the face recognition adversarial pattern configured to minimize a measure of distance, as determined by a face recognition system, between the face and a class of a first image or to maximize a probability of the misclassification of the second image by the face recognition system.

11. The face mountable device of claim 10, wherein the face recognition adversarial pattern is a post processed pattern for viewing from the face mountable device.

12. The face mountable device of claim 10, wherein the adversarial pattern generating system uses an iterative optimization method for adversarial pattern generation and the face recognition system uses a neural network for face recognition.

13. The face mountable device of claim 10, wherein the first image is a target image and the second image is an adversarial image and the face recognition adversarial pattern is configured to enable an impersonation of an individual corresponding to the first image.

14. The face mountable device of claim 13, wherein the face recognition adversarial pattern is configured to enable evasion of recognition as an individual corresponding to the second image.

15. The face mountable device of claim 10, wherein the face-mountable device is configured as one of an eyeglass frame, a headband, and a cheek patch that includes the electronic visual display.

16. The face mountable device of claim 10, wherein the face mountable device includes a programmable light emitting diode (LED) display or a programmable liquid crystal display (LCD).

17. A computer system, comprising:
one or more storage components; and
one or more processing components, the one or more processing components configured to cause:
a) accessing a first image;
b) accessing a second image;
c) from an adversarial pattern generating system, generating a face recognition adversarial pattern for display from a specified region of a face corresponding to the second image, the face recognition adversarial pattern operable to minimize a measure of distance, as determined by a face recognition system, between the face and a class of the first image or to maximize a probability of the misclassification of the second image by the face recognition system;
d) providing a face mountable device, that is mounted on the face, access to the face recognition adversarial pattern in real time via a communications component;
e) controlling light patterns on the face mountable device according to the face recognition adversarial pattern; and
f) determining if the face recognition system identifies the face as corresponding to the first image or the second image and repeating a) through e) for different first image and second image pairs to determine a susceptibility of the face recognition system to an adversarial attack.

18. The computer system of claim 17, further comprising:
post processing the face recognition adversarial pattern for viewing from the face mountable device before providing access to the face recognition adversarial pattern.

19. The computer system of claim 17, wherein the adversarial pattern generating system uses an iterative optimization method for adversarial pattern generation and the face recognition system uses a neural network for face recognition.

20. The computer system of claim 17, wherein the first image is a face image of a target and the second image is a face image of an adversary.

* * * * *